US009200970B2

(12) United States Patent
Kodani et al.

(10) Patent No.: US 9,200,970 B2
(45) Date of Patent: Dec. 1, 2015

(54) TRANSPARENT PIEZOELECTRIC SHEET-WITH-A-FRAME, TOUCH PANEL, AND ELECTRONIC DEVICE EACH HAVING THE TRANSPARENT PIEZOELECTRIC SHEET

(75) Inventors: Tetsuhiro Kodani, Settsu (JP); Yuuki Kuwajima, Settsu (JP); Eri Mukai, Settsu (JP); Meiten Koh, Settsu (JP); Takashi Kanemura, Settsu (JP); Kenji Omote, Sendai (JP); Hiroji Ohigashi, Sendai (JP)

(73) Assignees: Daikin Industries, Ltd., Osaka (JP); IDEAL STAR INC., Miyagi (JP)

( * ) Notice: Subject to any disclaimer, the term of this patent is extended or adjusted under 35 U.S.C. 154(b) by 183 days.

(21) Appl. No.: 13/639,825

(22) PCT Filed: Feb. 28, 2011

(86) PCT No.: PCT/JP2011/054521
§ 371 (c)(1),
(2), (4) Date: Oct. 5, 2012

(87) PCT Pub. No.: WO2011/125389
PCT Pub. Date: Oct. 13, 2011

(65) Prior Publication Data
US 2013/0027339 A1 Jan. 31, 2013

(30) Foreign Application Priority Data
Apr. 7, 2010 (JP) .................................. 2010-089065

(51) Int. Cl.
*H01L 41/053* (2006.01)
*H01L 41/193* (2006.01)
(Continued)

(52) U.S. Cl.
CPC . *G01L 1/16* (2013.01); *G06F 3/041* (2013.01); *G06F 2203/04105* (2013.01)

(58) Field of Classification Search
None
See application file for complete search history.

(56) References Cited

U.S. PATENT DOCUMENTS 5,663,505 A * 9/1997 Nakamura ...................... 73/702
6,892,582 B1 * 5/2005 Satou et al. ..................... 73/715
(Continued)

FOREIGN PATENT DOCUMENTS

JP          5-61592 A      3/1993
JP      2004-125571 A      4/2004
(Continued)

OTHER PUBLICATIONS

International Search Report of corresponding PCT Application No. PCT/JP2011/054521.
(Continued)

*Primary Examiner* — Kathy Wang-Hurst
*Assistant Examiner* — Douglas Wilson
(74) *Attorney, Agent, or Firm* — Global IP Counselors

(57) ABSTRACT

A transparent piezoelectric sheet-with-a-frame includes a transparent piezoelectric sheet and a frame covering a peripheral edge portion of the transparent piezoelectric sheet. The transparent piezoelectric sheet includes one transparent piezoelectric film including an organic polymer, one first transparent plate electrode placed on a first main surface of the transparent piezoelectric film and having a first transparent plate electrode portion, and one second transparent plate electrode placed on a second main surface of the transparent piezoelectric film and having a second transparent plate electrode portion. An outline of the second transparent plate electrode portion is positioned inside an outline of the first transparent plate electrode portion as seen in a plan view. The outline of the first transparent plate electrode portion completely coincides with the frame, and the outline of the second transparent plate electrode portion does not at all coincide with the frame as seen in the plan view.

19 Claims, 5 Drawing Sheets

(51) Int. Cl.
*G06F 3/041* (2006.01)
*G01L 1/16* (2006.01)

(56) References Cited

U.S. PATENT DOCUMENTS

| | | | |
|---|---|---|---|
| 7,152,482 B2* | 12/2006 | Ueno et al. | 73/723 |
| 7,215,329 B2* | 5/2007 | Yoshikawa et al. | 345/173 |
| 7,714,845 B2* | 5/2010 | Matsumoto et al. | 345/173 |
| 2004/0263483 A1* | 12/2004 | Aufderheide | 345/173 |
| 2006/0137457 A1* | 6/2006 | Zdeblick | 73/715 |
| 2006/0144154 A1* | 7/2006 | Ueno et al. | 73/723 |
| 2007/0181456 A1* | 8/2007 | Kusuda et al. | 206/443 |
| 2008/0276713 A1* | 11/2008 | Yamamoto et al. | 73/723 |
| 2009/0013792 A1* | 1/2009 | Qiao et al. | 73/723 |
| 2009/0085443 A1* | 4/2009 | Hishinuma et al. | 310/364 |
| 2009/0315430 A1* | 12/2009 | Tsuda | 310/313 B |
| 2009/0322704 A1* | 12/2009 | Anno | 345/174 |
| 2010/0058875 A1* | 3/2010 | Baumgartner et al. | 73/723 |
| 2010/0073316 A1* | 3/2010 | Nozawa et al. | 345/173 |
| 2010/0095778 A1* | 4/2010 | Sato | 73/756 |
| 2010/0103126 A1* | 4/2010 | Nakamura et al. | 345/173 |
| 2010/0107772 A1* | 5/2010 | Takizawa | 73/723 |
| 2010/0220071 A1* | 9/2010 | Nishihara et al. | 345/173 |
| 2010/0253183 A1* | 10/2010 | Ando et al. | 310/338 |
| 2010/0327994 A1* | 12/2010 | Choy et al. | 333/187 |
| 2011/0071775 A1* | 3/2011 | Khazeni | 702/52 |
| 2011/0115738 A1* | 5/2011 | Suzuki et al. | 345/173 |

FOREIGN PATENT DOCUMENTS

| | | | | |
|---|---|---|---|---|
| JP | 2004-534974 A | | 11/2004 | |
| JP | 2006-92428 A | | 4/2006 | |
| JP | 2006-092428 A | * | 4/2006 | G06F 3/041 |
| JP | 2006-163619 A | | 6/2006 | |
| JP | 2009-80090 A | | 4/2009 | |
| JP | 2010-26938 A | | 2/2010 | |

OTHER PUBLICATIONS

International Preliminary Report of corresponding PCT Application No. PCT/JP2011/054521.

* cited by examiner

TRANSPARENT PIEZOELECTRIC SHEET-WITH-A-FRAME, TOUCH PANEL, AND ELECTRONIC DEVICE EACH HAVING THE TRANSPARENT PIEZOELECTRIC SHEET

CROSS-REFERENCE TO RELATED APPLICATIONS

This U.S. National stage application claims priority under 35 U.S.C. §119(a) to Japanese Patent Application No. 2010-089065, filed in Japan on Apr. 7, 2010, the entire contents of which are hereby incorporated herein by reference.

TECHNICAL FIELD

The present invention relates to a transparent piezoelectric sheet-with-a-frame, a touch panel, and an electronic device each having a transparent piezoelectric sheet.

BACKGROUND ART

In recent years, display and input devices having touch panels, which are input devices, installed on the front surfaces of display devices such as liquid crystal displays have been put into practical use and are being used in operation panels of portable devices, such as mobile telephones, and home appliances. Display and input devices using touch panels enable the user to intuitively operate the device by pressing the display on the screen.

Touch panels that have been put into practical use so far have only been able to detect the position the user has pressed (in the present specification, this will sometimes be called "touch position") and have not been able to detect the force with which the user has pressed the touch panel (that is, the height (force) of the pressing; in the present specification, this will sometimes be called "touch pressure"). In display and input devices using touch panels, the touch panel is installed on the front surface of the display device, so it is required that the transparency of the touch panel be high in order to raise the visibility of the display of the display device.

As an input device or something similar that is capable of detecting the force of the pressing and is transparent, for example, Japanese Patent Unexamined Publication No. 2006-163619 discloses a touch panel portion that is used as a member of electronic paper and comprises a piezoelectric, a first electrode disposed on one side of the piezoelectric, and a second electrode disposed on the other side of the piezoelectric.

Further, Japanese Patent Unexamined Publication No. 2004-534974 discloses a touchscreen system comprising: a first sensor system coupled to a touchscreen, said first sensor system determining a set of position coordinates for each touch of said touchscreen; and a second sensor system coupled to said touchscreen, said second sensor system confirming each touch of said touchscreen by a first type of object, and invalidating each touch of said touchscreen by a second type of object, wherein said second sensor system is incapable of determining said set of position coordinates. And as the first sensor system, specifically force sensors placed outside the viewing area of an LCD are disclosed.

Further, Japanese Patent Unexamined Publication No. 2004-125571 discloses a transparent piezoelectric sensor in which a transparent pressure-sensitive layer that is piezoelectric and a pair of transparent conductive film layers that are placed opposing each other via the transparent pressure-sensitive layer are formed on a pair of transparent substrates that oppose each other.

SUMMARY

Technical Problem

According to the research of the present inventors, in a transparent piezoelectric sheet for touch pressure detection, from the standpoint of widening the effective area of touch pressure detection it is preferred that entire main surfaces of a transparent piezoelectric film used in this be piezoelectric, and from the standpoint of raising the precision of touch pressure detection it is preferred that as wide an area as possible of two main surfaces of the transparent piezoelectric film be covered by a pair of transparent plate electrodes. Because of this, touch pressure detection in a wider area on the transparent piezoelectric sheet and with higher precision becomes possible.

Such a transparent piezoelectric sheet for touch pressure detection is preferably used in combination with a touch panel for touch position detection. At this time, it is preferred that the size of the transparent piezoelectric sheet for touch pressure detection as seen in a plan view not exceed the size of the touch panel for touch position detection, and it is desired that the transparent piezoelectric sheet for touch pressure detection be able to detect touch pressure in all of the detection-effective region of the touch panel for touch position detection. It is generally known that it is always required that the proportion of the area of the detection-effective region in the area of the touch panel for touch position detection be high, but in order to be able to detect touch pressure in all of the detection-effective region of the touch panel for touch position detection, inevitably an even stricter requirement than that of the touch panel for touch position detection becomes imposed on the transparent piezoelectric sheet for touch pressure detection.

This requirement can be met provided that touch pressure detection is possible in the entire surface of the transparent piezoelectric sheet for touch pressure detection. In order to make this possible, it suffices for the entire surfaces of the two main surfaces of the transparent piezoelectric sheet for touch pressure detection to be covered by transparent plate electrodes.

However, it is preferred that the peripheral portion of the transparent piezoelectric sheet for touch pressure detection be covered by a frame from the standpoint of handling ease and so forth.

In this case, if touch pressure detection is possible in the entire surface of the transparent piezoelectric sheet for touch pressure detection, the transparent piezoelectric sheet ends up detecting the pressure applied by the frame, and this renders impossible the detection of touch pressure that is the original purpose of the transparent piezoelectric sheet or else remarkably lowers the precision of the detection.

Further, there is also a case where the transparent piezoelectric sheet for touch pressure detection is not stored in a frame but is placed as is inside a casing having an open portion and used as a member of an electronic device. In this case also, if the inner edge portion of the casing that defines the open portion is in contact with the transparent piezoelectric sheet for touch pressure detection, like in the case of the frame the transparent piezoelectric sheet ends up detecting the pressure applied by the inner edge portion, and this renders impossible the detection of touch pressure that is the original purpose of the transparent piezoelectric sheet or else remarkably lowers the precision of the detection.

As a solution to this, it is conceivable to layer transparent plate electrodes only on the sections of the transparent piezoelectric film not covered by the frame. However, among the strict requirements as described above, in order to layer transparent plate electrodes only on the sections of both surface of the transparent piezoelectric film not covered by the frame, exact alignment is required and continuous production is difficult, which remarkably raises the product cost.

Further, although the outlines of the transparent plate electrodes normally are virtually inconspicuous, in a case where the outlines of the transparent plate electrodes on both surfaces of the transparent piezoelectric film have shifted a little, two outlines come to exist in extremely close positions, so they become conspicuous more than expected, are inferior in outward appearance, and end up drawing the needless attention of the user.

None of the publicly known touch panels and piezoelectric sensors described above have this problem because they are not intended to be used in combination with a touch panel for touch position detection.

It is an object of the present invention to provide a transparent piezoelectric sheet-with-a-frame that is capable of detecting touch pressure in a wider area and with higher precision, has a low manufacturing cost, and is superior in outward appearance.

Solution to Problem

The above-described problem can be solved by changing the sizes of transparent plate electrode portions of two transparent electrodes on both surfaces of a transparent piezoelectric film and placing the transparent plate electrode portions in such a way that the larger transparent plate electrode portion (called a "first transparent plate electrode portion" below) completely coincides with the aforementioned frame or an inner edge portion of a casing as seen in a plan view and the smaller transparent plate electrode portion (called a "second transparent plate electrode portion" below) does not at all coincide with the frame or the inner edge portion.

A transparent piezoelectric sheet-with-a-frame pertaining to a first aspect of the present invention comprises: a transparent piezoelectric sheet that comprises one transparent piezoelectric film including an organic polymer, one first transparent plate electrode placed on a first main surface of the transparent piezoelectric film, and one second transparent plate electrode placed on a second main surface of the transparent piezoelectric film, with the first transparent plate electrode having a first transparent plate electrode portion, the second transparent plate electrode having a second transparent plate electrode portion, and the outline of the second transparent plate electrode portion being positioned inside the outline of the first transparent plate electrode portion as seen in a plan view; and a frame that covers a peripheral edge portion of the transparent piezoelectric sheet, wherein as seen in a plan view the outline of the first transparent plate electrode portion completely coincides with the frame and the outline of the second transparent plate electrode portion does not at all coincide with the frame.

The outline of the second transparent plate electrode portion is positioned inside the outline of the first transparent plate electrode portion as seen in a plan view, on it becomes possible to suitably use the transparent piezoelectric sheet-with-a-frame in combination with a general touch position detection-use touch panel. Specifically, reliable touch pressure detection in the entire region within the range of the outline of the smaller second transparent plate electrode portion becomes possible, so reliable touch pressure detection in a desired (designed) wide region becomes possible. Because of this, in the case of using the transparent piezoelectric sheet in combination with a touch position detection-use touch panel, it becomes possible to make the region in which both touch pressure and touch position can be detected and the touch position detection region of the touch position detection-use touch panel coincide to a high degree.

Further, it suffices as long as the outline of the second transparent plate electrode portion is positioned inside the outline of the first transparent plate electrode portion as seen in a plan view, so even if the positional relationship between the first transparent plate electrode portion and the second transparent plate electrode portion shifts slightly, this does not affect the performance of the product. Because of this, the defect rate at the time of manufacture can be lowered and the manufacturing cost can be kept low.

The frame covers the peripheral edge portion of the transparent piezoelectric sheet in such a way that the outline of the first transparent plate electrode portion completely coincides with the frame as seen in a plan view, so the outline of the first transparent plate electrode portion is not visible to the user. For this reason, two outlines do not exist in extremely close positions, so the transparent piezoelectric sheet-with-a-frame is superior in outward appearance and these outlines do not needlessly draw the attention of the user.

Here, the outline of the second transparent plate electrode portion does not at all coincide with the frame as seen in a plan view, so the pressure inevitably resulting from the frame does not travel to the detection circuit as an electrical signal and so it does not hinder the detection of the touch pressure.

A transparent piezoelectric sheet-with-a-frame pertaining to a second aspect of the present invention is the transparent piezoelectric sheet-with-a-frame pertaining to the first aspect, wherein the ratio of the area of the second transparent plate electrode portion with respect to the area of the main surfaces of the transparent piezoelectric film is equal to or greater than 70%.

The ratio is more preferably equal to or greater than 90% and less than 100% and even more preferably equal to or greater than 95% and less than 100%.

The area of the second transparent plate electrode portion is ordinarily equal to the effective area of touch pressure detection, so because of this a sufficient effective area is obtained.

A transparent piezoelectric sheet-with-a-frame pertaining to a third aspect of the present invention is the transparent piezoelectric sheet-with-a-frame pertaining to the first or second aspect, wherein the thickness of the transparent piezoelectric film is 1 µm to 200 µm.

Because of this, even in the case of using the transparent piezoelectric sheet-with-a-frame in combination with a touch position detection-use touch panel, for example, the function of detecting touch pressure with high sensitivity and high precision can be imparted without impairing the sensitivity and precision of the detection of the touch position by the touch position detection-use touch panel. The thickness is preferably equal to or less than 50 µm from the standpoint of transparency and is preferably 20 µm to 100 µm from the standpoint of touch pressure detection sensitivity.

A transparent piezoelectric sheet-with-a-frame pertaining to a fourth aspect of the present invention is the transparent piezoelectric sheet-with-a-frame pertaining to any of the first to third aspects, wherein the organic polymer is an organic polymer selected from vinylidene fluoride-tetrafluoroethylene copolymer, vinylidene fluoride-trifluoroethylene copolymer, and polyvinylidene fluoride.

A transparent piezoelectric sheet-with-a-frame pertaining to a fifth aspect of the present invention is the transparent piezoelectric sheet-with-a-frame pertaining to any of the first to fourth aspects, wherein the first transparent plate electrode further has a first lead portion, and the second transparent plate electrode further has a second lead portion.

The first lead portion and the second lead portion respectively connect the first transparent plate electrode portion and the second transparent plate electrode portion to outside wires such as a detection circuit. Because of this, connection to the outside wires becomes easy.

Here, the frame preferably has grooves and/or holes for passing through the lead portions. Alternatively, part of the frame may be configured by a conductive material such as metal, whereby the first transparent plate electrode portion and the second transparent plate electrode portion may be connected to outside wires.

A transparent piezoelectric sheet-with-a-frame pertaining to a sixth aspect of the present invention is the transparent piezoelectric sheet-with-a-frame pertaining to any of the first to fifth aspects and further comprises a pressure-sensitive adhesive portion disposed on its surface.

Because of this, the transparent piezoelectric sheet-with-a-frame can be adhered to and used with an arbitrary object such as a touch position detection-use touch panel, and the function of detecting touch pressure can be imparted to the surface of that object.

Here, the pressure-sensitive adhesive portion can be disposed on the frame surface, for example.

Further, it is preferred that the pressure-sensitive adhesive portion be disposed in a position that is not visible to the user at the time of use.

A transparent piezoelectric sheet-with-a-frame pertaining to a seventh aspect of the present invention is the transparent piezoelectric sheet-with-a-frame pertaining to any of the first to sixth aspects, wherein the transparent piezoelectric sheet-with-a-frame is for touch pressure detection.

A transparent piezoelectric sheet-with-a-frame pertaining to an eighth aspect of the present invention is the transparent piezoelectric sheet-with-a-frame pertaining to any of the first to seventh aspects, wherein the transparent piezoelectric sheet-with-a-frame is used in combination with a touch position detection-use touch panel.

The transparent piezoelectric sheet-with-a-frame can detect touch pressure, so because of this, the function of detecting touch pressure can be imparted to the touch position detection-use touch panel.

The touch position detection-use touch panel is ordinarily placed on either the surface on the touch side of the transparent piezoelectric sheet-with-a-frame or the surface on the opposite side of the touch side.

At this time, the electrode on the touch position detection-use touch panel side of the transparent piezoelectric sheet-with-a-frame is ordinarily placed in such a way that it does not electrically contact the electrode of the touch position detection-use touch panel. Specifically, for example, a transparent insulating layer is placed between these electrodes in such a way as to be adjacent to them. The insulating layer is preferably flexible. The insulating layer may be an insulating adhesive layer that adheres together the transparent piezoelectric sheet-with-a-frame and the touch position detection-use touch panel. Alternatively, for example, a touch position detection-use touch panel having an insulating layer on its surface may be used. Other insulating layers used in the present invention may also be insulating adhesive layers.

However, in a case where the electrode on the touch position detection-use touch panel side of the transparent piezoelectric sheet-with-a-frame is a ground electrode and the electrode on the transparent piezoelectric sheet-with-a-frame side of the touch position detection-use touch panel is also a ground electrode, these two electrodes may contact each other.

A transparent piezoelectric sheet-with-a-frame pertaining to a ninth aspect of the present invention is the transparent piezoelectric sheet-with-a-frame pertaining to the eighth aspect, wherein the touch position detection-use touch panel is a resistive touch panel or a capacitive touch panel.

The transparent piezoelectric sheet-with-a-frame can, without impairing the advantageous characteristic of a resistive touch position detection-use touch panel that it has a low manufacturing cost or the advantageous characteristic of a capacitive touch position detection-use touch panel that multipoint detection is easy, impart the function of detecting touch pressure to these touch panels.

A touch panel pertaining to a tenth aspect of the present invention comprises: a touch position detection-use touch panel; and the transparent piezoelectric sheet-with-a-frame pertaining to any of the first to ninth aspects which is placed on one surface of the touch position detection-use touch panel.

The touch panel can detect both the pressure and the position of a touch.

The touch position detection-use touch panel is ordinarily placed on either the surface on the touch side of the transparent piezoelectric sheet-with-a-frame or the surface on the opposite side of the touch side.

At this time, the electrode on the touch position detection-use touch panel side of the transparent piezoelectric sheet-with-a-frame is ordinarily placed in such a way that it does not electrically contact the electrode of the touch position detection-use touch panel. Specifically, for example, an insulating layer is placed between these electrodes in such a way as to be adjacent to them. The insulating layer is preferably flexible.

However, in a case where the electrode on the touch position detection-use touch panel side of the transparent piezoelectric sheet-with-a-frame is a ground electrode and the electrode on the transparent piezoelectric sheet-with-a-frame side of the touch position detection-use touch panel is also a ground electrode, these two electrodes may contact each other.

A touch position detection-use touch panel pertaining to an eleventh aspect of the present invention has the transparent piezoelectric sheet-with-a-frame pertaining to the sixth aspect adhered to it by the pressure-sensitive adhesive portion.

A display device pertaining to a twelfth aspect of the present invention has the transparent piezoelectric sheet-with-a-frame pertaining to the sixth aspect adhered to it by the pressure-sensitive adhesive portion.

A touch panel pertaining to a thirteenth aspect of the present invention comprises: a transparent piezoelectric sheet that comprises one transparent piezoelectric film including an organic polymer, one first transparent plate electrode placed on a first main surface of the transparent piezoelectric film, and one second transparent plate electrode placed on a second main surface of the transparent piezoelectric film, with the first transparent plate electrode having a first transparent plate electrode portion, the second transparent plate electrode having a second transparent plate electrode portion, and the outline of the second transparent plate electrode portion being positioned inside the outline of the first transparent plate electrode portion as seen in a plan view; a touch position detection-use touch panel that is placed on one surface of the transparent piezoelectric sheet; and a frame that covers a peripheral edge portion of the transparent piezoelectric sheet and a peripheral edge portion of the touch position detection-use touch panel, wherein as seen in a plan view the outline of the first transparent plate electrode portion completely coincides with the frame and the outline of the second transparent plate electrode portion does not at all coincide with the frame.

The touch panel can detect both the pressure and the position of a touch.

Like what has been described in regard to the transparent piezoelectric sheet-with-a-frame pertaining to the first aspect, the outline of the second transparent plate electrode portion is positioned inside the outline of the first transparent plate electrode portion as seen in a plan view, so it becomes possible to make the detection region of the touch pressure detected by the touch pressure detection-use piezoelectric sheet and the detection region of the touch position detected by the touch position detection-use touch panel coincide to a high degree.

Further, like what has been described in regard to the transparent piezoelectric sheet-with-a-frame pertaining to the first aspect, the defect rate at the time of manufacture can be lowered and the manufacturing cost can be kept low.

Further, like what has been described in regard to the transparent piezoelectric sheet-with-a-frame pertaining to the first aspect, the transparent piezoelectric sheet-with-a-frame is superior in outward appearance.

Further, here, the outline of the second transparent plate electrode portion does not at all coincide with the frame as seen in a plan view, so the pressure inevitably resulting from the frame does not travel to the detection circuit as an electrical signal and so it does not hinder the detection of the touch pressure.

The touch position detection-use touch panel is ordinarily placed on either the surface on the touch side of the transparent piezoelectric sheet-with-a-frame or the surface on the opposite side of the touch side.

At this time, the electrode on the touch position detection-use touch panel side of the transparent piezoelectric sheet-with-a-frame is ordinarily placed in such a way that it does not electrically contact the electrode of the touch position detection-use touch panel. Specifically, for example, an insulating layer is placed between these electrodes in such a way as to be adjacent to them. The insulating layer is preferably flexible.

However, in a case where the electrode on the touch position detection-use touch panel side of the transparent piezoelectric sheet is a ground electrode and the electrode on the transparent piezoelectric sheet side of the touch position detection-use touch panel is also a ground electrode, these two electrodes may contact each other.

A touch panel pertaining to a fourteenth aspect of the present invention is the touch panel pertaining to the thirteenth aspect, wherein of the first transparent plate electrode and the second transparent plate electrode, the transparent plate electrode on the opposite side of the touch side is a ground electrode.

Because of this, the noise of the output voltage can be mitigated.

A touch panel pertaining to a fifteenth aspect of the present invention is the touch panel pertaining to the fourteenth aspect, wherein the transparent plate electrode on the opposite side of the touch side doubles as a ground electrode of the touch position detection-use touch panel.

Because of this, the structure of the touch panel can be simplified and the manufacturing cost can be lowered.

An electronic device pertaining to a sixteenth aspect of the present invention comprises: a transparent piezoelectric sheet that comprises one transparent piezoelectric film including an organic polymer, one first transparent plate electrode placed on a first main surface of the transparent piezoelectric film, and one second transparent plate electrode placed on a second main surface of the transparent piezoelectric film, with the first transparent plate electrode having a first transparent plate electrode portion, the second transparent plate electrode having a second transparent plate electrode portion, and the outline of the second transparent plate electrode portion being positioned inside the outline of the first transparent plate electrode portion as seen in a plan view; and a casing inside of which the transparent piezoelectric sheet is placed, wherein the casing has an open portion, and as seen in a plan view the outline of the first transparent plate electrode portion completely coincides with an inner edge portion that defines the open portion and the outline of the second transparent plate electrode portion does not at all coincide with the inner edge portion.

Further, like what has been described in regard to the transparent piezoelectric sheet-with-a-frame pertaining to the first aspect, the defect rate at the time of manufacture can be lowered and the manufacturing cost can be kept low.

Further, like what has been described in regard to the transparent piezoelectric sheet-with-a-frame pertaining to the first aspect, the transparent piezoelectric sheet-with-a-frame is superior in outward appearance.

The casing has the open portion, and as seen in a plan view the outline of the first transparent plate electrode portion completely coincides with the inner edge portion defining the open portion and the outline of the second transparent plate electrode portion does not at all coincide with the inner edge portion, so the pressure inevitably resulting from the frame does not travel to the detection circuit as an electrical signal and so it does not hinder the detection of the touch pressure.

An electronic device pertaining to a seventeenth aspect of the present invention is the electronic device pertaining to the sixteenth aspect and further comprises a touch position detection-use touch panel that is placed in contact with the surface on the opposite side of the touch side of the transparent piezoelectric sheet.

Because of this, the touch panel can detect both the pressure and the position of a touch.

Further, like what has been described in regard to the transparent piezoelectric sheet-with-a-frame pertaining to the first aspect, the detection region of the touch pressure detected by the touch pressure detection-use piezoelectric sheet and the detection region of the touch position detected by the touch position detection-use touch panel coincide to a high degree.

Here, the touch position detection-use touch panel is not particularly limited, and a conventionally used touch position detection-use touch panel can be used.

An electronic device pertaining to an eighteenth aspect of the present invention is the electronic device pertaining to the seventeenth aspect, wherein of the first transparent plate electrode and the second transparent plate electrode, the transparent plate electrode on the opposite side of the touch side is a ground electrode.

Because of this, the noise of the output voltage can be mitigated.

A electronic device pertaining to a nineteenth aspect of the present invention is the electronic device pertaining to the eighteenth aspect, wherein the transparent plate electrode on the opposite side of the touch side doubles as a ground electrode of a touch position detection-use touch panel.

Because of this, the structure of the touch panel can be simplified and the manufacturing cost can be lowered.

Advantageous Effects of Invention

The transparent piezoelectric sheet, the touch panel, and the electronic device of the present invention are capable of detecting touch pressure in a wider effective area and with higher precision and have a low manufacturing cost.

DESCRIPTION OF EMBODIMENTS

Figure 1A:
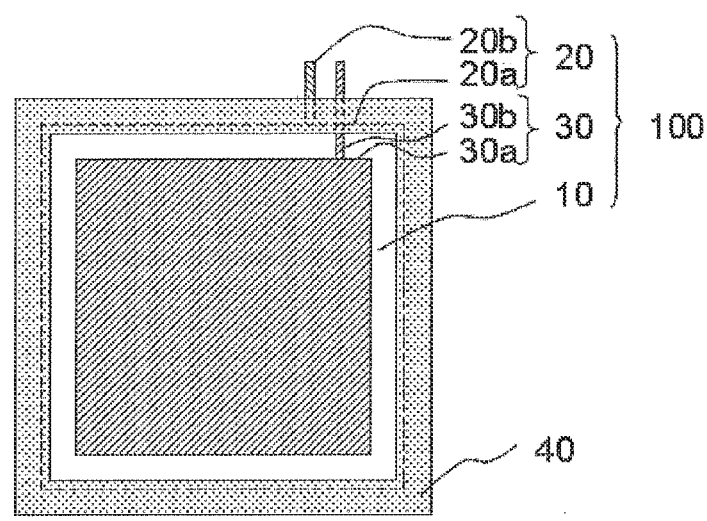
FIG. 1(a) is a plan view showing the configuration of an aspect of a transparent piezoelectric sheet-with-a-frame of the present invention.

Embodiments of the present invention will be described below with reference to the drawings, but the present invention is not limited thereto. In order to give priority to facilitating understanding, these drawings do not accurately depict ratios between dimensions. Further, it is not the case that the configural requirements described below are all configural requirements essential to the present invention. Portions having the same reference signs in the drawings below express the same meanings.

Throughout the present specification, the term "copolymer" is used with the intention of including random copolymers, block copolymers, and graft copolymers as long as there are no particular limitations otherwise.

Throughout the present specification, the term "transparent" means light-transmissive and more specifically that total light transmittance as measured by a method in accordance with the method described in ASTM D1003 is equal to or greater than 40%.

First Embodiment

Transparent Piezoelectric Sheet-with-a-Frame

First, the configuration of a transparent piezoelectric sheet of the present embodiment will be described.

A transparent piezoelectric sheet-with-a-frame of the present embodiment comprises: a transparent piezoelectric sheet 100 that comprises one transparent piezoelectric film 10 including an organic polymer, one first transparent plate electrode 20 placed on a first main surface of the transparent piezoelectric film 10, and one second transparent plate electrode 30 placed on a second main surface of the transparent piezoelectric film 10, with the first transparent plate electrode 20 having a first transparent plate electrode portion 20a, the second transparent plate electrode 30 having a second transparent plate electrode portion 30a, and the outline of the second transparent plate electrode portion 30a being positioned inside the outline of the first transparent plate electrode portion 20a as seen in a plan view; and a frame 40 that covers a peripheral edge portion of the transparent piezoelectric sheet 100, wherein as seen in a plan view the outline of the first transparent plate electrode portion 20a completely coincides with the frame 40 and the outline of the second transparent plate electrode portion 30a does not at all coincide with the frame 40.

The transparent piezoelectric sheet-with-a-frame of the present embodiment will be described with reference to FIG. 1. The arrow in the drawing indicates a touch direction.

As shown in FIG. 1, the transparent piezoelectric sheet-with-a-frame of the present embodiment is equipped with the transparent piezoelectric sheet 100 and the frame 40.

The transparent piezoelectric sheet 100 is equipped with the one transparent piezoelectric film 10, the one first transparent plate electrode 20, and the one second transparent plate electrode 30.

FIG. 1(a) is a plan view seen from the side of the second transparent plate electrode 30.

The transparent piezoelectric film 10 is not particularly limited as long as it includes an organic polymer and is piezoelectric and transparent. Examples of the organic polymer include vinylidene fluoride-tetrafluoroethylene copolymer, vinylidene fluoride-trifluoroethylene copolymer, and polyvinylidene fluoride. Particularly preferred examples of the transparent piezoelectric film 10 include films formed from a polymer such as vinylidene fluoride-tetrafluoroethylene copolymer, vinylidene fluoride-trifluoroethylene copolymer, and polyvinylidene fluoride.

Preferred among these is a film formed from vinylidene fluoride-tetrafluoroethylene copolymer.

The ratio (mole ratio) between vinylidene fluoride and tetrafluoroethylene in the vinylidene fluoride-tetrafluoroethylene copolymer is preferably 50:50 to 90:10 and more preferably 65:35 to 80:20 from the standpoint of piezoelectricity related to touch pressure detection sensitivity.

The film formed from vinylidene fluoride-tetrafluoroethylene copolymer, the film formed from vinylidene fluoride-trifluoroethylene copolymer, and the film formed from polyvinylidene fluoride may be films that have been subjected to a stretching treatment from the standpoint of improving piezoelectricity.

The transparent piezoelectric film 10 may include additives added to resin films to the extent that they do not harm its piezoelectricity and transparency.

The thickness of the transparent piezoelectric film 10 is ordinarily 1 μm to 200 μm, is preferably equal to or less than 50 μm from the standpoint of transparency, and is preferably 20 μm to 100 μm from the standpoint of touch pressure detection sensitivity.

The transparent piezoelectric film 10 may be a single film or may comprise plural films.

The transparent piezoelectric film 10 preferably has a quadrilateral shape.

The first transparent plate electrode 20 is placed on the first main surface of the transparent piezoelectric film 10.

As shown in FIG. 1, the first transparent plate electrode 20 at least has the first transparent plate electrode portion 20a and preferably further has a first lead portion 20b. The first lead portion 20b makes it easy to connect the first transparent plate electrode 20 to a detection circuit 300 via an electrical wire 70.

It suffices for the first transparent plate electrode 20 to be transparent. As the first transparent plate electrode 20, for example, an electrode selected from inorganic electrodes, such as ITO (indium tin oxide) and tin oxide, and conducting polymers, such as thiophene conducting polymers, polyaniline, and polypyrrole, can be used.

The second transparent plate electrode 30 is placed on the second main surface of the transparent piezoelectric film 10—that is, on the surface on the opposite side of the first main surface on which the first transparent plate electrode 20 is placed.

As shown in FIG. 1, the second transparent plate electrode 30 at least has the second transparent plate electrode portion 30a and preferably further has a second lead portion 30b. The second lead portion 30b makes it easy to connect the second transparent plate electrode 30 to the detection circuit 300 via an electrical wire 70.

The outline of the second transparent plate electrode portion 30a is positioned inside the outline of the first transparent plate electrode portion 20a as seen in a plan view.

The ratio of the area of the second transparent plate electrode portion with respect to the area of the main surfaces of the transparent piezoelectric film is preferably equal to or greater than 70%. Here, the area of the second transparent plate electrode portion is equal to the effective area of touch pressure detection.

As the second transparent plate electrode 30, an electrode that is the same as the first transparent plate electrode 20 can be used.

Optionally, the front surface (particularly the front surface that is touched) of the first transparent plate electrode 20 and/or the second transparent plate electrode 30 may, in order to protect these, be covered by a protective layer such as a flexible resin sheet such as a polyethylene terephthalate sheet. The protective layer may double as an insulating layer.

The frame 40 covers in a frame-like manner the peripheral edge portion of the transparent piezoelectric sheet 100. Although they are not shown in the drawings, grooves and holes through which the first lead portion 20b and the second lead portion 30b pass are disposed in the frame 40. Alternatively, part of the frame 40 may be configured by a conductive material such as metal, whereby the first transparent plate electrode portion 20a and the second transparent plate electrode portion 30a may be connected to outside wires.

As shown in FIG. 1, the first transparent plate electrode portion 20a is placed in such a way that its outline completely coincides with the frame 40 as seen in a plan view. The second transparent plate electrode portion 30a is placed in such a way that its outline does not at all coincide with the frame 40 as seen in a plan view.

Because of this, the pressure resulting from the frame does not travel to the detection circuit as an electrical signal and so it does not hinder the detection of the touch pressure, and the transparent piezoelectric sheet-with-a-frame of the present embodiment is superior in outward appearance.

A pressure-sensitive adhesive portion 50 is disposed on a surface of the frame 40.

Because of this, the transparent piezoelectric sheet-with-a-frame of the present embodiment can be adhered to and used with a touch position detection-use touch panel and/or a display.

Next, a method of manufacturing the transparent piezoelectric sheet-with-a-frame of the present embodiment will be described.

The transparent piezoelectric sheet of the present embodiment can be manufactured, for example, by a manufacturing method including the following steps.

(1) A step of preparing the transparent piezoelectric film 10 that includes the organic polymer and whose entire main surfaces are piezoelectric (2) A step of layering the first transparent plate electrode 20 on part of the first main surface of the transparent piezoelectric film 10

(3) A step of layering the second transparent plate electrode 30 on part of the second main surface of the transparent piezoelectric film 10

(4) A step of accommodating the transparent piezoelectric sheet that has been obtained by steps (1) to (3) in the frame 40

In step (1), a transparent film is formed by a conventional method from the polymers described above. The film may also be acquired as a commercial product.

The film may be optionally subjected to a stretching treatment from the standpoint of improving piezoelectricity. Here, for the stretching, threefold to tenfold stretching in one axial direction is preferred. The stretching treatment may be performed by a conventional method.

The method of imparting piezoelectricity to the film differs depending also on the polymer configuring the film, but it suffices to perform a polarization treatment (also called a poling treatment) in order to impart piezoelectricity to the film formed from vinylidene fluoride-tetrafluoroethylene copolymer, vinylidene fluoride-trifluoroethylene copolymer, or polyvinylidene fluoride.

The polarization treatment can be performed by a corona discharge treatment or a conventional method. For example, the film may be sandwiched from both sides by metal electrodes or the like, and a 30 to 400 MV/m DC electric field may be applied for 0.1 second to 60 minutes.

In step (2), the first transparent plate electrode 20 is layered on the first main surface of the transparent piezoelectric film 10. The first transparent plate electrode 20 can, for example, be layered by being formed by sputtering or deposition on the surface of the transparent piezoelectric film 10.

Further, as another method, a resin sheet (e.g., a polyethylene terephthalate sheet (a PET sheet)) equipped with the first transparent plate electrode 20 may be placed in such a way that the first transparent plate electrode 20 side opposes the transparent piezoelectric film 10. Here, it is preferred that the first transparent plate electrode 20 be adjacent to the transparent piezoelectric film 10, but as long as the piezoelectric signal can be detected, the first transparent plate electrode 20 and the transparent piezoelectric film 10 may also be adhered to each other by a transparent adhesive (e.g., epoxy adhesive).

The first transparent plate electrode portion 20a and the first lead portion 20b can be formed as a unit.

In step (3), it suffices for the second transparent plate electrode 30 to be layered in the same way using an electrode that is the same as the first transparent plate electrode 20.

The second transparent plate electrode portion 30a and second lead portion 30b can be formed as a unit.

It suffices for step (4) to be implemented by a conventional method in accordance with the form of the frame 40. The material of the frame 40 is not particularly limited, but a frame made of resin is preferred.

Next, the use of the transparent piezoelectric sheet-with-a-frame of the present embodiment will be described with reference to FIG. 1(b).

Figure 1B:
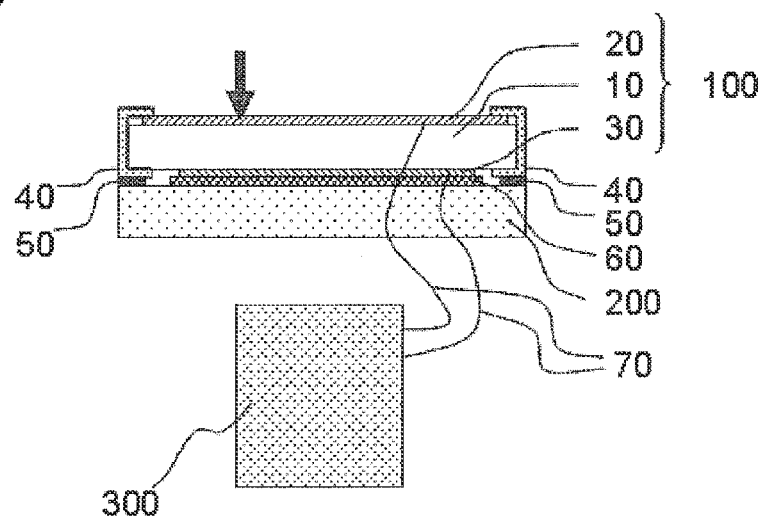
FIG. 1(b) is a sectional side view describing its mode of use.

In FIG. 1(b), a touch position detection-use touch panel 200 is placed on the surface on the opposite side of the touch side of the transparent piezoelectric sheet 100. The touch position detection-use touch panel 200 is in contact with the transparent piezoelectric sheet 100 via an insulating layer 60.

The transparent piezoelectric sheet 100 can be adhered by the pressure-sensitive adhesive portion 50 to one surface of the touch position detection-use touch panel 200 and used.

An electrical signal produced by pressing, as indicated by the arrow in FIG. 1(b), the region of overlap between the first transparent plate electrode 20 and the second transparent plate electrode 30 travels through the electrical wires 70 to the detection circuit 300, and the pressing (touch pressure) is detected. The transparent piezoelectric sheet 100 is flexible, so the touch position detection-use touch panel 200 also receives the pressure of the touch at the same time via the insulating layer 60. Because of this, the touch position is also detected by the touch position detection-use touch panel 200.

As described above, the first transparent plate electrode portion 20a is placed in such a way that its outline completely coincides with the frame 40 as seen in a plan view.

The direction of this plan view ordinarily becomes substantially identical to the direction in which the user sees the transparent piezoelectric sheet-with-a-frame of the present embodiment when the user touches it, on the outline of the first transparent plate electrode portion is not visible to the user. For this reason, two outlines do not exist in extremely close positions, so these outlines do not needlessly draw the attention of the user.

Further, alternatively, the transparent piezoelectric sheet 100 can also be adhered by the pressure-sensitive adhesive portion 50 to a display surface of a display device and used.

The transparent piezoelectric sheet 100 can detect touch pressure, so the transparent piezoelectric sheet-with-a-frame of the present embodiment can be used for touch pressure detection.

Second Embodiment

Touch Panel

First, the configuration of a touch panel of the present embodiment will be described.

A touch panel of the present embodiment comprises: a transparent piezoelectric sheet 100 that comprises one transparent piezoelectric film 10 including an organic polymer, one first transparent plate electrode 20 placed on a first main surface of the transparent piezoelectric film 10, and one second transparent plate electrode 30 placed on a second main surface of the transparent piezoelectric film 10, with the first transparent plate electrode 20 having a first transparent plate electrode portion 20a, the second transparent plate electrode 30 having a second transparent plate electrode portion 30a, and the outline of the second transparent plate electrode portion 30a being positioned inside the outline of the first transparent plate electrode portion 20a as seen in a plan view; a touch position detection-use touch panel 201 that is placed on one side surface of the transparent piezoelectric sheet 100; and a frame 41 that covers a peripheral edge portion of the transparent piezoelectric sheet 100 and a peripheral edge portion of the touch position detection-use touch panel 201, wherein as seen in a plan view the outline of the first transparent plate electrode portion 20a completely coincides with the frame 41 and the outline of the second transparent plate electrode portion 30a does not at all coincide with the frame 41.

The touch panel of the present embodiment will be described with reference to FIG. 2. The arrow in the drawing indicates a touch direction.

As shown in FIG. 2, the touch panel of the present embodiment is equipped with the transparent piezoelectric sheet 100, the frame 41, an insulating layer 60, and the touch position detection-use touch panel 201. The transparent piezoelectric sheet 100 is configured from the one transparent piezoelectric film 10, the one first transparent plate electrode 20, and the one second transparent plate electrode 30.

Here, the transparent piezoelectric film 10, the first transparent plate electrode 20, and the second transparent plate electrode 30 each express the same meanings as those described in the first embodiment.

Figure 2A:
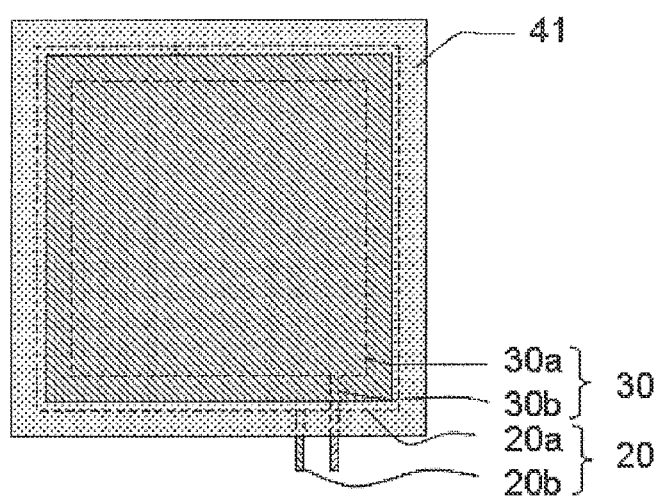
FIG. 2(a) is a plan view showing the configuration of an aspect of a touch panel of the present invention.

FIG. 2(a) is a plan view seen from the side of the first transparent plate electrode 20.

Figure 2B:
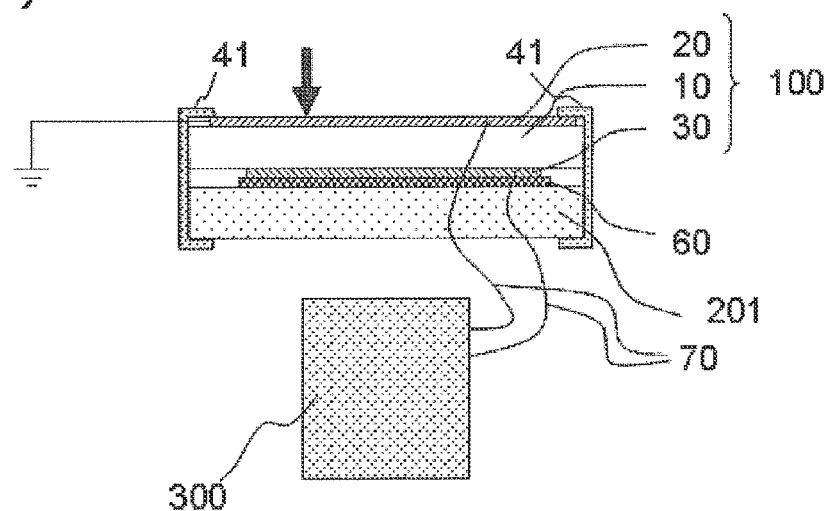
FIG. 2(b) is a sectional side view describing its mode of use.

In FIG. 2(b), the first transparent plate electrode 20 is placed on the surface on the touch side of the transparent piezoelectric sheet 100 and is a ground electrode.

The touch position detection-use touch panel 201 is placed on the surface on the opposite side of the touch side of the transparent piezoelectric sheet 100 in such a way as to be in contact with the transparent piezoelectric sheet 100 via the insulating layer 60.

Here, the touch position detection-use touch panel 201 is not particularly limited, and a conventionally used touch position detection-use touch panel with an arbitrary format such as a resistance touch panel, a capacitance touch panel, a surface acoustic wave touch panel, and an optical touch panel can be used.

The transparent piezoelectric sheet 100 is flexible, on an electrical signal produced by pressing the transparent piezoelectric sheet 100 as indicated by the arrow in FIG. 2(b) travels through the electrical wires 70 to the detection circuit 300, and the pressing (touch pressure) is detected. The transparent piezoelectric sheet 100 is flexible, so the touch position detection-use touch panel 201 also receives the pressure of the touch at the same time via the insulating layer 60. Because of this, the touch position is also detected by the touch position detection-use touch panel 201.

The frame 41 covers in a frame-like manner the peripheral edge portions of the transparent piezoelectric sheet 100 and the touch position detection-use touch panel 201. Although they are not shown in the drawings, grooves and holes through which the first lead portion 20b and the second lead portion 30b are passed are disposed in the frame 41. Alternatively, part of the frame 41 may be configured by a conductive material such as metal, whereby part of all of these lead portions may be substituted by that section.

As shown in FIG. 2, the first transparent plate electrode portion 20a is placed in such way that its outline completely coincides with the frame 41 as seen in a plan view. The second transparent plate electrode portion 30a is placed in such a way that its outline does not at all coincide with the frame 41 as seen in a plan view.

Optionally, the front surface particularly the front surface that is touched) of the first transparent plate electrode 20 and/or the second transparent plate electrode 30 may, in order to protect these, be covered by a protective layer such as a flexible resin sheet such as a polyethylene terephthalate sheet. The protective layer may double as an insulating layer.

The transparent piezoelectric sheet 100 can detect touch pressure, on the touch panel of the present embodiment can be used for touch pressure and touch position detection.

Third Embodiment

Electronic Device

First, the configuration of an electronic device of the present embodiment will be described.

The electronic device of the present embodiment comprises: a transparent piezoelectric sheet 100 that comprises one transparent piezoelectric film 10 including an organic polymer, one first transparent plate electrode 20 placed on first main surface of the transparent piezoelectric film 10, and one second transparent plate electrode 30 placed on a second main surface of the transparent piezoelectric film 10, with the first transparent plate electrode 20 having a first transparent plate electrode portion 20a, the second transparent plate electrode 30 having a second transparent plate electrode portion 30a, and the outline of the second transparent plate electrode portion 30a being positioned inside the outline of the first transparent plate electrode portion 20a as seen in a plan view; and a casing 42 inside of which the transparent piezoelectric sheet 100 is placed, wherein the casing has an open portion 42a, and as seen in a plan view the outline of the first transparent plate electrode portion 20a completely coincides with an inner edge portion 42b that defines the open portion 42a and the outline of the second transparent plate electrode portion 30a does not at all coincide with the inner edge portion 42b.

The electronic device of the present embodiment will be described with reference to FIG. 3. The arrow in the drawing indicates a touch direction.

Figure 3A:
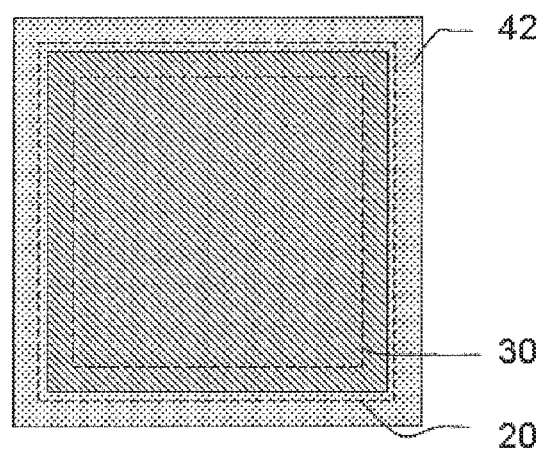
FIG. 3(a) is a plan view showing the configuration of an aspect of an electronic device of the present invention.
Figure 3B:
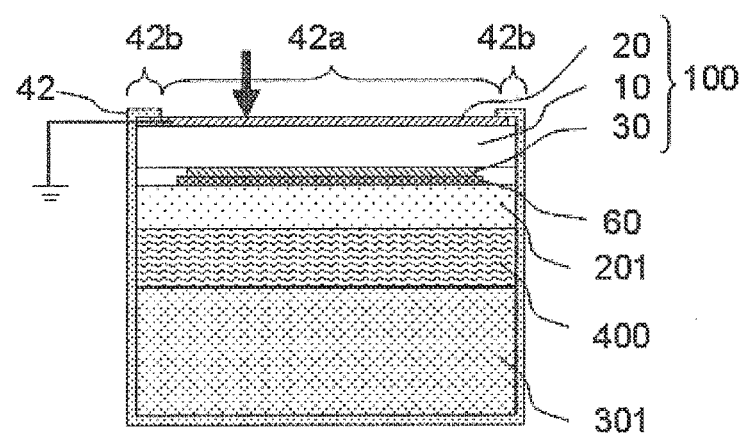
FIG. 3(b) is a sectional side view describing its mode of use.

As shown in FIG. 3, the electronic device of the present embodiment is equipped with the transparent piezoelectric sheet 100, the casing 42, an insulating layer 60, a touch position detection-use touch panel 201, a display device 400, and a detection circuit 301. Although they are omitted in FIG. 3, the first transparent plate electrode 20 and the second transparent plate electrode 30 are each connected by electrical wires to the detection circuit 301.

The transparent piezoelectric sheet 100 comprises the one transparent piezoelectric film 10, the one first transparent plate electrode 20, and the one second transparent plate electrode 30.

The first transparent plate electrode 20 is placed on the first main surface of the transparent piezoelectric film 10.

Further, the second transparent plate electrode 30 is placed on the second main surface of the transparent piezoelectric film 10.

The outline of the second transparent plate electrode portion 30a is positioned inside the outline of the first transparent plate electrode portion 20a as seen in a plan view like in the case of the transparent piezoelectric sheet 100 of FIG. 1.

Here, the transparent piezoelectric film 10, the first transparent plate electrode 20, the second transparent plate electrode 30, the insulating layer 60, and the touch position detection-use touch panel 201 express the same meanings as those described in the second embodiment (touch panel). As shown in FIG. 3, the touch position detection-use touch panel 201 is placed on the surface on the opposite side of the touch side of the transparent piezoelectric sheet 100 in such away as to be in contact with the transparent piezoelectric sheet 100 via the insulating layer 60.

That is, the electronic device of the present embodiment corresponds to a configuration in which the transparent piezoelectric sheet 100 and the touch position detection-use touch panel 201 in the second embodiment (touch panel) are used as members of an electronic device.

However, in the electronic device of the present embodiment, it is not necessary to connect the first transparent plate electrode 20 and the second transparent plate electrode 30 to an outside detection circuit, so the need for the first lead portion 20b and the second lead portion 30b is small. In the present embodiment, the first transparent plate electrode 20 comprises the first transparent plate electrode portion 20a and the second transparent plate electrode 30 comprises the second transparent plate electrode portion 30a.

The first transparent plate electrode 20 is placed on the surface on the touch side of the transparent piezoelectric sheet 100 and is a ground electrode.

Optionally, the front surface (particularly the front surface that is touched) of the first transparent plate electrode 20 and/or the second transparent plate electrode 30 may, in order to protect these, be covered by a protective layer such as a flexible resin sheet such as a polyethylene terephthalate sheet. The protective layer may double as an insulating layer.

The casing 42 has the open portion 42a and the inner edge portion 42b that defines the open portion 42a. As shown in FIG. 3, the outline of the first transparent plate electrode portion 20a completely coincides with the inner edge portion 42b defining the open portion 42a as seen in a plan view. The outline of the second transparent plate electrode portion 30a does not at all coincide with the inner edge portion 42b as seen in a plan view.

An electrical signal produced by pressing, as indicated by the arrow in FIG. 3, the region of overlap between the first transparent plate electrode 20 and the second transparent plate electrode 30 in a predetermined position according to an image displayed by the display device 400 travels through the electrical wires to the detection circuit 301, and the pressing (touch pressure) is detected. And, because the transparent piezoelectric sheet 100 is flexible, the touch position detection-use touch panel 201 also receives the pressure of the touch at the same time via the insulating layer 60. Because of this, the touch position is also detected by the touch position detection-use touch panel 201, and on the basis of this the electronic device operates as preset. As is apparent from the above description, operation of the electronic device by touch is performed in the open portion 42a.

Examples of such electronic devices include mobile telephones, laptop computers, and computer monitors each having an operation portion equipped with a touch panel.

Figure 4:
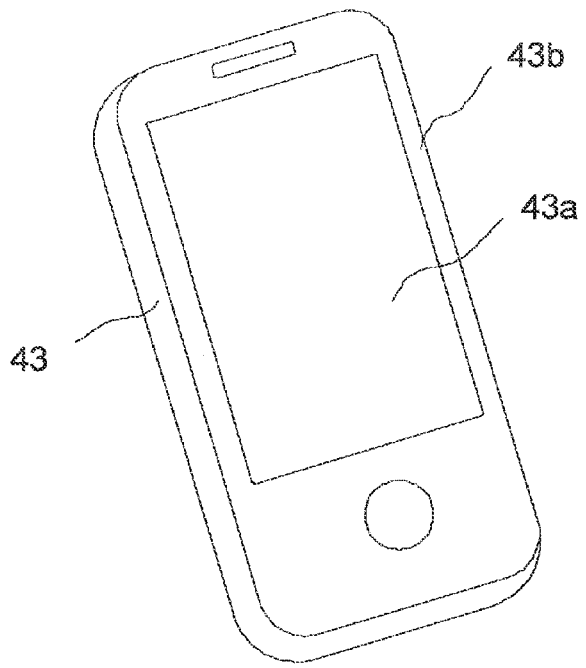
FIG. 4 is a perspective view showing the configuration of an aspect of the electronic device of the present invention.

FIG. 4 shows a schematic diagram in a case where the electronic device is a mobile telephone. The mobile telephone has a casing 43 that has an open portion 43a and an inner edge portion 43b that defines the open portion 43a. Although it is not shown, the transparent piezoelectric sheet 100 is placed in such a way as to be covered in a frame-like manner by the inner edge portion 43b.

The present invention has been described above, but the present invention is not intended to be limited only to the above embodiments and, it goes without saying, is capable of a variety of other modifications possible without departing from the gist thereof. Several of those modifications will be specifically described below.

<Modification 1>

A touch panel and an electronic device of the present modification will be described with reference to FIG. 5.

Figure 5:
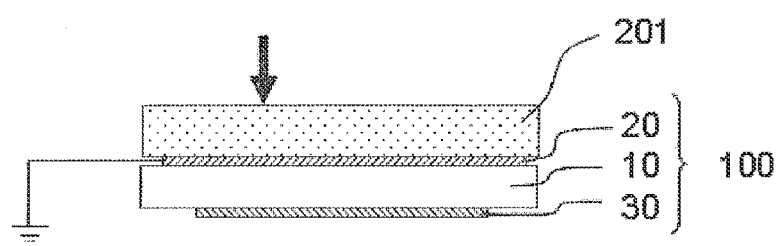
FIG. 5 is a sectional view describing sections of the touch panel and the electronic device of the present invention.

In the second embodiment (touch panel) and the third embodiment (electronic device), the touch position detection-use touch panel 201 is placed on the surface on the opposite side of the touch side of the transparent piezoelectric sheet 100, but as shown in FIG. 5, in modification 1, conversely from this the touch position detection-use touch panel 201 is placed on the surface on the touch side of the transparent piezoelectric sheet 100.

The touch position detection-use touch panel 201 is in directly contact with the transparent piezoelectric sheet 100.

The first transparent plate electrode 20 of the transparent piezoelectric sheet 100 is a ground electrode placed on the surface on the touch side of the transparent piezoelectric film 10 and doubles as a ground electrode of the touch position detection-use touch panel 201. Because of this structural simplification, the touch panel and the electronic device of the present modification have low manufacturing costs.

FIG. 5, which describes the touch panel and the electronic device of the present modification, shows only the touch position detection-use touch panel 201 and the transparent piezoelectric sheet 100, but other sections are the same as those in the second embodiment (touch panel and the third embodiment (electronic device).

The position of the touch indicated by the arrow in FIG. 5 is detected by the touch position detection-use touch panel 201, and the touch pressure is detected by the transparent piezoelectric sheet 100.

<Modification 2>

A touch panel and an electronic device of the present modification will be described with reference to FIG. 6.

Figure 6:
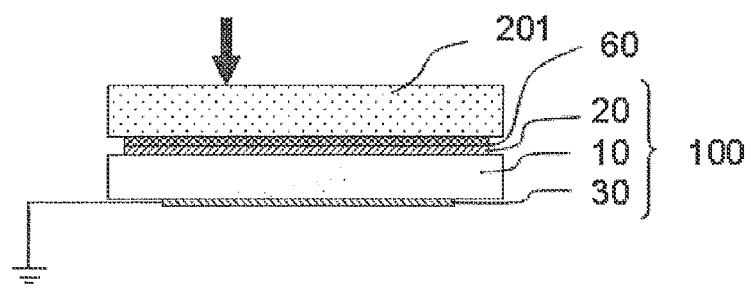
FIG. 6 is a sectional view describing sections of the touch panel and the electronic device of the present invention.

As shown in FIG. 6, like in modification 1, the touch position detection-use touch panel 201 is placed on the surface on the touch side of the transparent piezoelectric sheet 100.

The second transparent plate electrode 30 of the transparent piezoelectric sheet 100 is placed on the surface on the opposite side of the touch side and is a ground electrode. In this way, the ground electrode is placed on the opposite side of the touch side, so in the touch panel and the electronic device of the present modification, the noise of the output voltage is mitigated.

The position of the touch indicated by the arrow in FIG. 6 is detected by the touch position detection-use touch panel 201, and the touch pressure is detected by the transparent piezoelectric sheet 100.

<Modification 3>

A touch panel and an electronic device of the present modification will be described with reference to FIG. 7.

Figure 7:
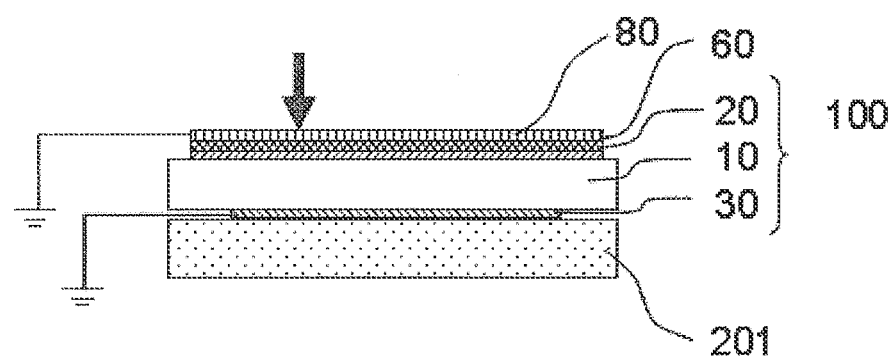
FIG. 7 is a sectional view describing sections of the touch panel and the electronic device of the present invention.

As shown in FIG. 7, the touch position detection-use touch panel 201 is placed on the surface on the opposite side of the touch side of the transparent piezoelectric sheet 100.

The second transparent plate electrode 30 of the transparent piezoelectric sheet 100 is placed on the surface on the opposite side of the touch side and is a ground electrode.

A ground electrode 80 is placed via an insulating layer 60 on the surface on the touch side of the transparent piezoelectric sheet 100.

In this way, ground electrodes are placed on both main surfaces of the transparent piezoelectric sheet 100, so in the touch panel and the electronic device of the present modification, the noise of the output voltage is particularly mitigated.

The pressure of the touch indicated by the arrow in FIG. 7 is detected by the transparent piezoelectric sheet 100, and the touch position is detected by the touch position detection-use touch panel 201.

INDUSTRIAL APPLICABILITY

The transparent piezoelectric sheet of the present invention can be used in touch panels and the like.

What is claimed is:

1. A transparent piezoelectric sheet-with-a-frame comprising:
   a transparent piezoelectric sheet including
      one transparent piezoelectric film including an organic polymer,
      one first transparent plate electrode placed on a first main surface of the transparent piezoelectric film, the first transparent plate electrode having a first transparent plate electrode portion, and
      one second transparent plate electrode placed on a second main surface of the transparent piezoelectric film, the second transparent plate electrode having a second transparent plate electrode portion,
      an outline of the second transparent plate electrode portion being positioned inside an outline of the first transparent plate electrode portion as seen in a plan view; and
   a frame covering a peripheral edge portion of the transparent piezoelectric sheet,
   as seen in the plan view,
      the outline of the first transparent plate electrode portion overlapping an entirety of an inner periphery of the frame and
      the outline of the second transparent plate electrode portion not overlapping the inner periphery of the frame and being spaced inwardly from the inner periphery of the frame.

2. The transparent piezoelectric sheet-with-a-frame according to claim 1, wherein
   a ratio of an area of the second transparent plate electrode portion with respect to an area of the first and second main surfaces of the transparent piezoelectric film is equal to or greater than 70%.

3. The transparent piezoelectric sheet-with-a-frame according to claim 1, wherein
   a thickness of the transparent piezoelectric film is 1 to 200 μm.

4. The transparent piezoelectric sheet-with-a-frame according to claim 1, wherein
   the organic polymer is selected from vinylidene fluoride-tetrafluoroethylene copolymer, vinylidene fluoride-trifluoroethylene copolymer, and polyvinylidene fluoride.

5. The transparent piezoelectric sheet-with-a-frame according to claim 1, wherein
   the first transparent plate electrode further has a first lead portion, and
   the second transparent plate electrode further has a second lead portion.

6. The transparent piezoelectric sheet-with-a-frame according to claim 1, further comprising
   a pressure-sensitive adhesive portion disposed on a surface of the transparent piezoelectric sheet-with-a-frame.

7. The transparent piezoelectric sheet-with-a-frame according to claim 1, wherein
   the transparent piezoelectric sheet-with-a-frame is configured to detect touch pressure.

8. The transparent piezoelectric sheet-with-a-frame according to claim 1, wherein
   the transparent piezoelectric sheet-with-a-frame is used in combination with a touch position detection-use touch panel.

9. The transparent piezoelectric sheet-with-a-frame according to claim 8, wherein
   the touch position detection-use touch panel is a resistive touch panel or a capacitive touch panel.

10. A touch panel including the transparent piezoelectric sheet-with-a-frame according to claim 1, the touch panel further comprising
    a touch position detection-use touch panel, with the transparent piezoelectric sheet-with-a-frame being placed on one surface of the touch position detection-use touch panel.

11. A touch position detection-use touch panel including the transparent piezoelectric sheet-with-a-frame according to claim 6 adhered thereto by the pressure-sensitive adhesive portion.

12. A display device including the transparent piezoelectric sheet-with-a-frame according to claim 6 adhered thereto by the pressure-sensitive adhesive portion.

13. A touch panel comprising:
a transparent piezoelectric sheet including
   one transparent piezoelectric film including an organic polymer,
   one first transparent plate electrode placed on a first main surface of the transparent piezoelectric film, the first transparent plate electrode having a first transparent plate electrode portion, and
   one second transparent plate electrode placed on a second main surface of the transparent piezoelectric film, the second transparent plate electrode having a second transparent plate electrode portion,
   an outline of the second transparent plate electrode portion being positioned inside an outline of the first transparent plate electrode portion as seen in a plan view;
a touch position detection-use touch panel placed on one surface of the transparent piezoelectric sheet; and
a frame covering a peripheral edge portion of the transparent piezoelectric sheet and a peripheral edge portion of the touch position detection-use touch panel,
as seen in a plan view,
   the outline of the first transparent plate electrode portion overlapping an entirety of an inner periphery of the frame and
   the outline of the second transparent plate electrode portion not overlapping the inner periphery of the frame and being spaced inwardly from the inner periphery of the frame.

14. The touch panel according to claim 13, wherein
one of the first transparent plate electrode and the second transparent plate electrode on an opposite side of a touch side is a ground electrode.

15. The touch panel according to claim 14, wherein
the one of the first transparent plate electrode and the second transparent plate electrode on the opposite side of the touch side doubles as a ground electrode of the touch position detection-use touch panel.

16. An electronic device comprising:
a transparent piezoelectric sheet including
   one transparent piezoelectric film including an organic polymer,
   one first transparent plate electrode placed on a first main surface of the transparent piezoelectric film, the first transparent plate electrode having a first transparent plate electrode portion, and
   one second transparent plate electrode placed on a second main surface of the transparent piezoelectric film, the second transparent plate electrode having a second transparent plate electrode portion,
   an outline of the second transparent plate electrode portion being positioned inside an outline of the first transparent plate electrode portion as seen in a plan view; and
a casing with the transparent piezoelectric sheet placed inside the casing, the casing having an open portion,
as seen in a plan view,
   the outline of the first transparent plate electrode portion overlapping an entirety of an inner edge portion defining the open portion and
   the outline of the second transparent plate electrode portion not overlapping the inner edge portion and being spaced inwardly from the inner edge portion.

17. The electronic device according to claim 16, further comprising
a touch position detection-use touch panel placed in contact with a surface on an opposite side of a touch side of the transparent piezoelectric sheet.

18. The electronic device according to claim 17, wherein
one of the first transparent plate electrode and the second transparent plate electrode on the opposite side of the touch side is a ground electrode.

19. The electronic device according to claim 18, wherein
the one of the first transparent plate electrode and the second transparent plate electrode on the opposite side of the touch side doubles as a ground electrode of a touch position detection-use touch panel.

\* \* \* \* \*